United States Patent
Liu et al.

(10) Patent No.: US 7,576,974 B2
(45) Date of Patent: Aug. 18, 2009

(54) FLAT PANEL DISPLAY DEVICE

(75) Inventors: Chang-Chun Liu, Shenzhen (CN); Guo-Fu Guo, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 13 days.

(21) Appl. No.: 11/927,705

(22) Filed: Oct. 30, 2007

(65) Prior Publication Data

US 2008/0144266 A1  Jun. 19, 2008

(30) Foreign Application Priority Data

Dec. 19, 2006  (CN) .................... 2006 20 201077 U

(51) Int. Cl.
G06F 1/16  (2006.01)
(52) U.S. Cl. ............................ 361/679.07; 361/679.22; 312/223.1; 312/223.2; 248/919
(58) Field of Classification Search ................ 361/679, 361/681–683, 679.07, 679.22; 248/917–919, 248/921, 922; 312/223.1, 223.2
See application file for complete search history.

(56) References Cited

U.S. PATENT DOCUMENTS

| 4,365,779 | A | * | 12/1982 | Bates et al. ................. 248/371 |
| 4,566,664 | A | * | 1/1986 | Donald ..................... 248/349.1 |
| 4,820,956 | A | * | 4/1989 | Slobodzian et al. ........... 315/51 |
| 5,947,440 | A | * | 9/1999 | Cho ........................... 361/681 |
| 6,010,111 | A | * | 1/2000 | Cho ....................... 248/346.06 |
| 6,089,520 | A | * | 7/2000 | Wu et al. .................... 248/371 |
| 6,116,560 | A | * | 9/2000 | Kim .......................... 248/371 |
| 6,869,056 | B2 | * | 3/2005 | Tsukuda ..................... 248/371 |
| 2006/0016942 | A1 | * | 1/2006 | Lo ............................. 248/131 |
| 2007/0215762 | A1 | * | 9/2007 | Lee et al. ................. 248/125.7 |

FOREIGN PATENT DOCUMENTS

CN  03204278.7  2/2004

* cited by examiner

Primary Examiner—Jayprakash N Gandhi
Assistant Examiner—Anthony Q Edwards
(74) Attorney, Agent, or Firm—Frank R. Niranjan

(57) ABSTRACT

A flat panel display device includes a display, a connector secured to a bottom of the display, and a stand. The connector includes a pivot portion and two opposing arm portions extending from the pivot portion. The stand includes a top wall with a receiving space defined thereunder. The top wall defines a mounting channel therein. The mounting channel includes a receiving groove for pivotably receiving the pivot portion of the connector, and two opposing passing grooves extending from the receiving groove to allow the corresponding arm portions to pass therethrough and enter into the receiving space. The flat panel display device with simple structure is easy for use, assembly and disassembly.

11 Claims, 5 Drawing Sheets

FLAT PANEL DISPLAY DEVICE

BACKGROUND

1. Field of the Invention

The present invention relates to display devices, and particularly to a flat panel display device.

2. Description of Related Art

Flat panel display devices, such as Liquid Crystal Displays, Plasma Display Panels and Organic Light Emitting Diodes, have become the most popular display devices in the market. Because of its large display area and thinness, a flat panel display device includes a stand, and a flat panel display mounted to the stand to be firmly supported. The flat panel display often engages with the stand via screws or clips, which is awkward and inconvenient for assembly or disassembly. Further more, tools may be needed to help in assembling and disassembling the flat panel display device, which may lead to accidental damage to the flat panel display or the stand.

In the Chinese Patent NO. 03204278.7, an improved mounting structure between a flat panel display and a host computer is disclosed. The mounting structure includes a rotating tray, a stand, and a rotating bracket. The rotating tray includes a column and a flange extending from the circumference of the column at a bottom. A through hole is defined in the column. The stand mounted to the host computer includes a hollow cylinder for receiving the column of the rotating tray and depending on the flange of the rotating tray. The rotating bracket includes two mounting ears respectively extending up from opposite ends thereof. A mounting hole is defined in each mounting ear. A shaft is inserted in each mounting hole and engaged with the display to mount the rotating bracket to the display. The present invention is easy for use. However, it is difficult to assemble.

What is desired, therefore, is a flat panel display device which is easy to assemble and use.

SUMMARY

An exemplary flat panel display device includes a display, a connecter secured to a bottom of the display, and a stand. The connecter includes a pivot portion and two opposing arm portions extending from the pivot portion. The stand includes a top wall with a receiving space defined thereunder. The top wall defines a mounting channel therein. The mounting channel includes a receiving groove for pivotably receiving the pivot portion of the connecter, and two opposing passing grooves extending from the receiving groove to allow the corresponding arm portions to pass therethrough and enter into the receiving space.

Other advantages and novel features will become more apparent from the following detailed description when taken in conjunction with the accompanying drawings, in which:

DETAILED DESCRIPTION

Figure 1:
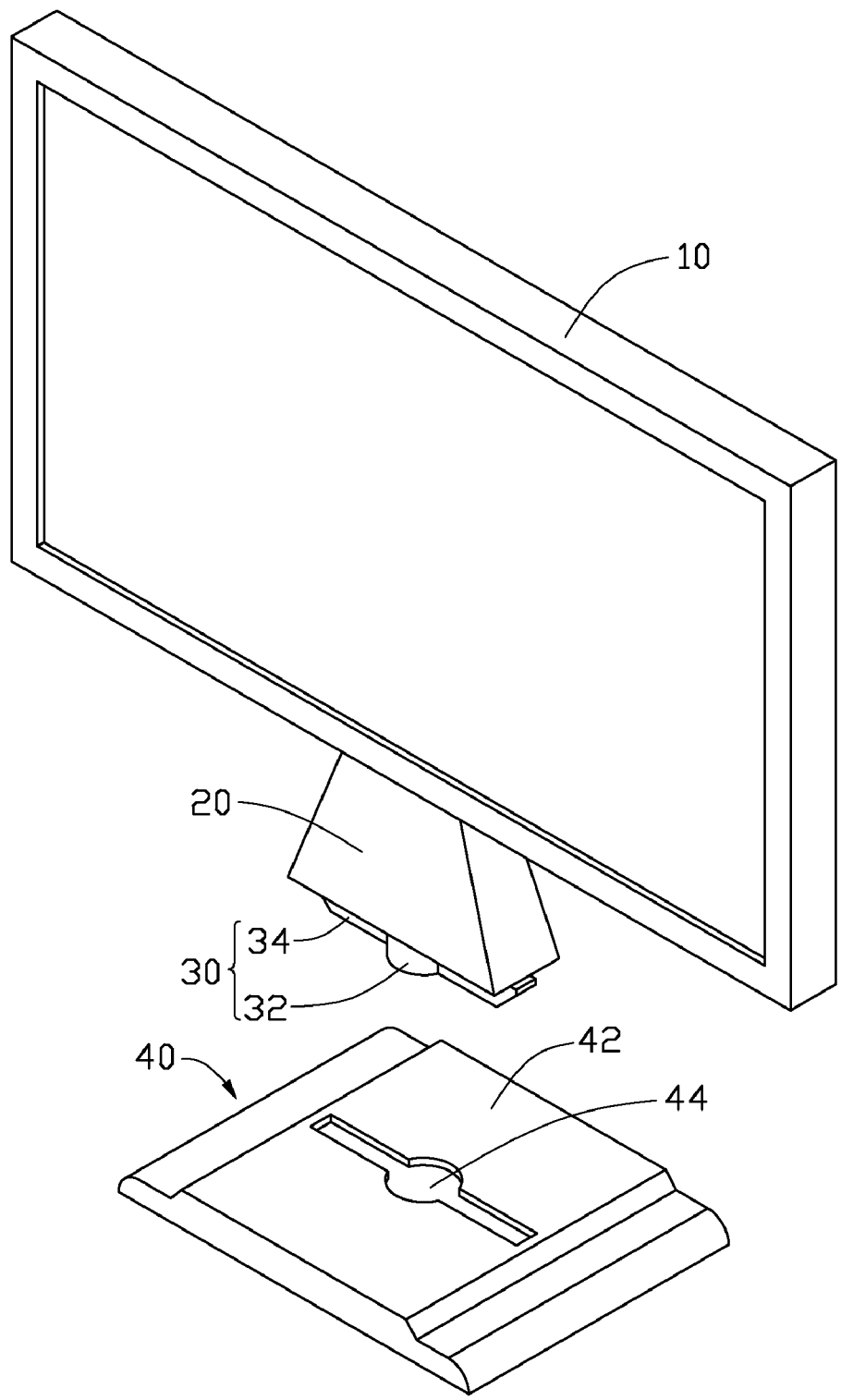
FIG. 1 is an exploded, isometric view of a flat panel display device in accordance with an embodiment of the present invention, the flat panel display device includes a stand.

Referring to FIG. 1, a flat panel display device in accordance with an embodiment of the present invention includes a display 10, a connecter 30, and a stand 40.

Figure 5:
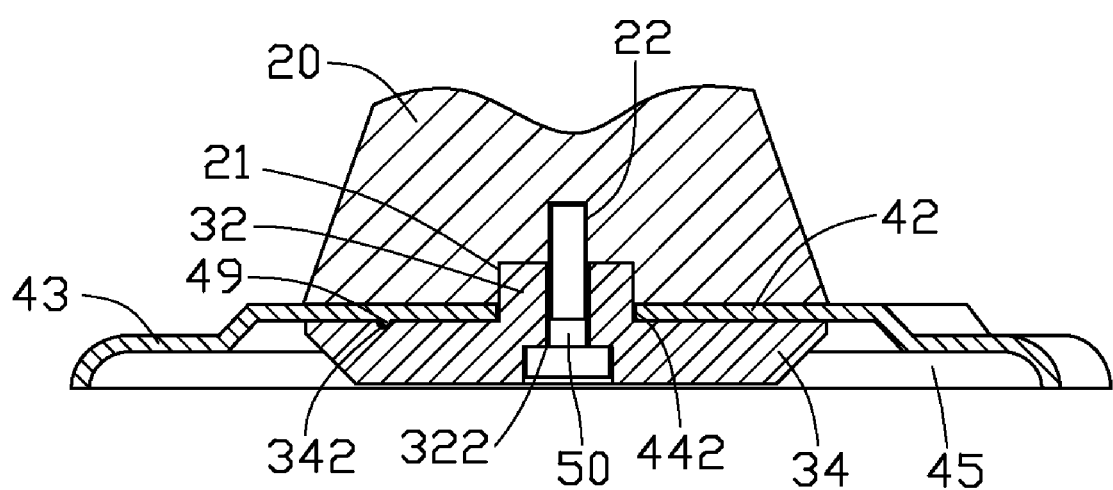
FIG. 5 is a cross-sectional view of a part of FIG. 3.

Referring also to FIG. 5, the display 10 includes a support 20 extending downward therefrom. An accommodating space 21 is formed in a bottom of the support 20. A mounting hole 22 is defined in the top wall of the accommodating space 21.

A longitudinal section of the connecter 30 generally has an inverted T shape. The connecter 30 includes a cylinder-shaped pivot portion 32, and two arms 34 extending toward opposite directions from a round side of the pivot portion 32. The pivot portion 32 protrudes from top surfaces of the arms 34 a height greater than the depth of the accommodating space 21 of the support 20. A small depressed portion 342 is defined in the top surface of one of the arms 34. A through hole 322 corresponding to the mounting hole 22 of the support 20 is defined in the pivot portion 32. A mounting element 50 is inserted through the through hole 322 of the pivot portion 32 and engaged in the mounting hole 22 of the support 20 of the display 10 to secure the connecter 30 to the bottom of the support 20.

Figure 2:
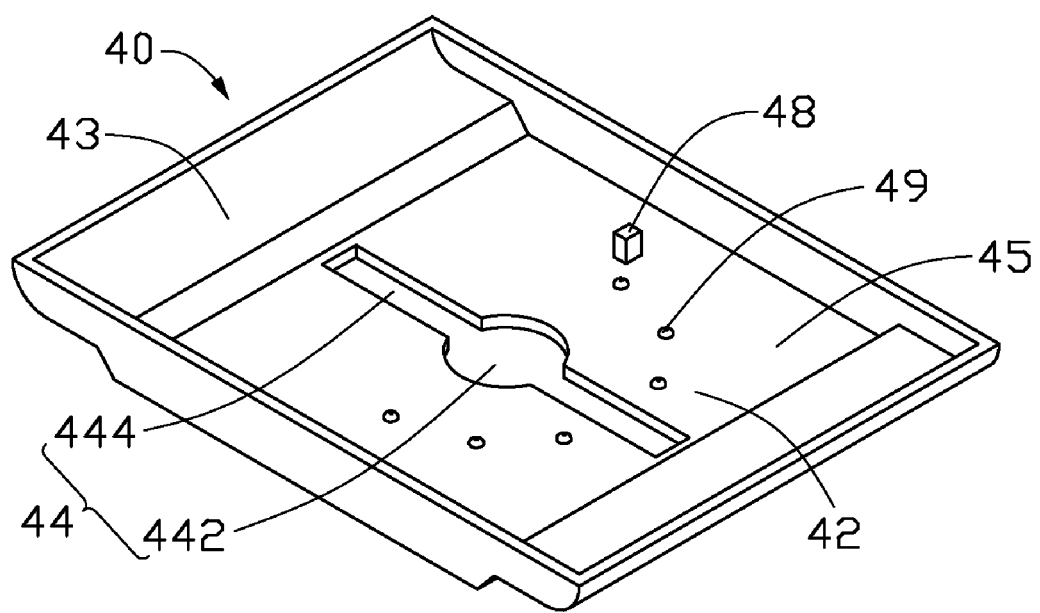
FIG. 2 is an inverted, isometric view of the stand of FIG. 1.

Referring also to FIG. 2, the stand 40 includes a top wall 42, and a plurality of sidewalls 43 extending downward from edges of the top wall 42. A receiving space 45 is surrounded by the top wall 42 and the sidewalls 43. A linear mounting channel 44 corresponding to the connecter 30 is defined in the top wall 42. The mounting channel 44 includes a round receiving groove 442 corresponding to the pivot portion 32 of the connecter 30 and two passing grooves 444 extending from opposite sides of the round receiving groove 442. The diameter of the receiving groove 442 is a little greater than that of the pivot portion 32 of the connecter 30, and the size of each passing groove 444 is a little greater than that of the corresponding arm 34 of the connecter 30, which is convenient for assembling. A block 48 and a plurality of small raised portions 49 extend from a bottom surface of the top wall 42. The raised portions 49 are arranged at opposite sides of a passing groove 444 and along a semicircle coaxial to the receiving groove 442 with a radius larger than that of the receiving groove 442. The block 48 is located adjacent to a raised portion 49 at an end of the semicircle. A straight line from the block 48 to the center of the receiving groove 442 is longer than the radius of the semicircle. In other embodiments, the mounting channel 44 of the stand 40 may have a wave shape, and the connecter 30 is changed to have a similar shape.

Figure 3:
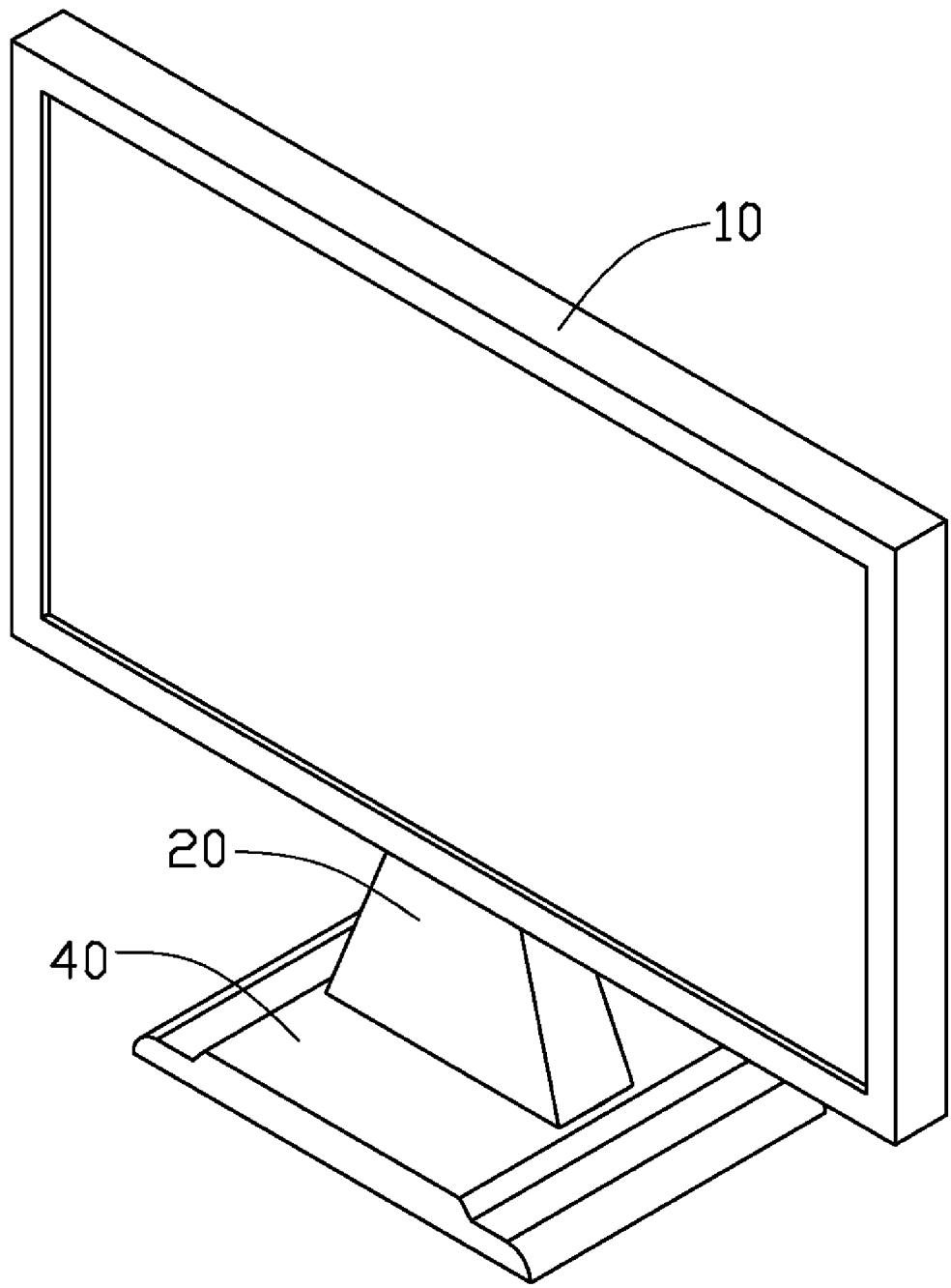
FIGS. 3 and 4 are assembled views of FIG. 1, showing two different states.
Figure 4:
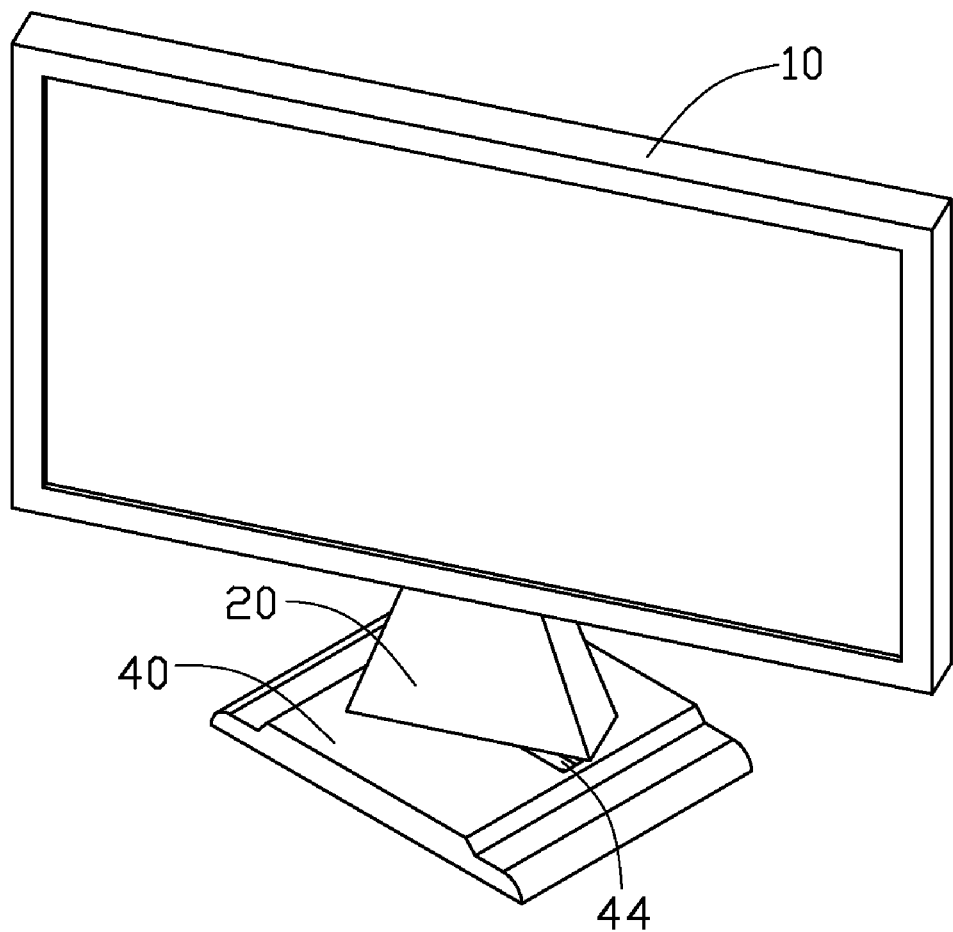

Referring to FIGS. 3 to 5, in assembly, an upper portion of the pivot portion 32 of the connecter 30 is secured to the support 20 of the display 10 via the mounting element 50, with an interval being formed between the bottom surface of the support 20 and the top surfaces of the arms 34 of the connecter 30. A lower portion of the pivot portion 32 of the connecter 30 passes through the receiving groove 442, and the arms 34 of the connecter 30 pass through the corresponding passing grooves 444 of the stand 40. Corresponding parts of the top wall 42 of the stand 40 are accommodated in the interval between the bottom surface of the support 20 and the top surfaces of the arms 34 of the connecter 30. The display 10 together with the connecter 30 are rotated relative to the stand 40, so that the arms 34 of the connecter 30 are rotated into the receiving space 45 and contact with the bottom surface of the top wall 42 of the stand 40. In the present embodiment, the bottom surface of the support 20 can be rotatably engaged with the top surface of the top wall 42 of the stand 40.

In rotating the display 10 relative to the stand 40, one of the raised portions 49 of the top wall 42 of the stand 40 is advantageously snappingly received in the depressed portion 342 of the connecter 30, for locating the display 10 in a desired position. Furthermore, the arms 34 of the connecter 30 are blocked by the block 48 of the stand 40 when the connecter 30 is rotated, to limit rotation of the connecter 30 to about 90 degrees.

In disassembly, the display 10 is rotated until the arms 34 of the connecter 30 align with the corresponding passing grooves 444 of the mounting channel 44 of the stand 40. The display 10 is moved upward and disengaged from the stand 40.

Furthermore, the connecter 30, the stand 40 (especially the top wall 42 of the stand 40), and the bottom of the support 20 may be made of high-rigidity material suitable to withstand the pressures or forces involved in the assembly and use of the present invention.

In other embodiments, one or more connecters 30 and mounting channels 44 of the stand 40 may be added according to a shape of the display, in order to strengthen the securing and supporting function for the display. Furthermore, these connecters 30 may be arranged in a line, a triangle, a square, a trapezium, a "W", or any other forms, and the mounting channels 44 correspondingly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being exemplary embodiments of the invention.

What is claimed is:

1. A flat panel display device comprising:
   a display;
   a connecter secured to a bottom of the display, the connecter comprising a pivot portion and two opposing arm portions extending from the pivot portion; and
   a stand comprising a top wall with a receiving space defined thereunder, the top wall defining a mounting channel therein, the mounting channel comprising a receiving groove for pivotably receiving the pivot portion of the connecter, and two opposing passing grooves extending from the receiving groove to allow the corresponding arm portions to pass therethrough and enter into the receiving space;
   wherein a through hole is defined in the pivot portion of the connecter, the display comprises a support extending downward therefrom for supporting the display, a mounting hole corresponding to the through hole of the connecter is defined in the support, a mounting element is inserted through the through hole of the connecter and engaged in the mounting hole of the support.

2. The flat panel display device as claimed in claim 1, wherein an accommodating space is formed in the bottom of the support, the mounting hole is defined in a top wall of the accommodating space, the pivot portion protrudes from top surfaces of the arm portions of the connecter a height greater than the depth of the accommodating space, an upper portion of the pivot portion is received in the accommodating space when the connecter is secured to the support.

3. The flat panel display device as claimed in claim 2, wherein corresponding parts of the top wall of the stand are sandwiched between a bottom surface of the support and the top surfaces of the arm portions of the connecter when the arm portions of the connecter are entered into the receiving space of the stand and rotated away from the passing grooves.

4. The flat panel display device as claimed in claim 1, wherein a depressed portion is defined in the top surface of one of the arm portions of the connecter, the top wall of the stand comprises a plurality of raised portions extending down from a bottom surface thereof, each of the raised portions is capable of being snappingly received in the depressed portion for locating the display at different degrees relative to the stand.

5. The flat panel display device as claimed in claim 4, wherein the receiving groove of the mounting channel has a round shape, the pivot portion of the connecter is cylinder-shaped.

6. The flat panel display device as claimed in claim 5, wherein the raised portions of the stand are arranged at opposite sides of a corresponding passing groove of the mounting channel and along a semicircle coaxial to the receiving groove of the stand with a radius larger than that of the receiving groove.

7. The flat panel display device as claimed in claim 6, wherein the top wall of the stand further comprises a block extending from the bottom surface thereof, the block is located adjacent to a raised portion at an end of the semicircle, for blocking the arm portions of the connecter to limit rotation of the display.

8. The flat panel display device as claimed in claim 1, wherein the connecter and the stand are made of high-rigidity material.

9. A flat panel display device comprising:
   a display having a support extending down therefrom, the support defining a mounting hole;
   a connecter comprising a vertical pivot portion and an arm portion horizontally extending from a lower portion of a circumference of the pivot portion, an upper portion of the pivot portion being mounted to a bottom of the support of the display, an interval formed between a bottom surface of the support and a top surface of the arm portion; and
   a stand comprising a top wall, and a supporting portion configured for standing on a plane, a receiving space formed in the stand under the top wall, the top wall defining a receiving groove and a passing groove communicating with each other, the receiving groove allowing the pivot portion of the connecter to be pivotably received therein, the passing groove allowing the arm portion of the connecter to pass therethrough and enter into the receiving space such that parts of the top wall accommodated in the interval formed between a bottom surface of the support and a top surface of the arm portion;
   wherein a through hole corresponding to the mounting hole of the support of the display is defined in the pivot portion of the connecter, a mounting element is inserted through the through hole of the connecter and engaged in the mounting hole of the support.

10. The flat panel display device as claimed in claim 9, wherein a depressed portion is defined in the top surface of the arm portion of the connecter, the top wall of the stand comprises a plurality of raised portions extending down from a bottom surface thereof, each of the raised portions is capable to snappingly received in the depressed portion for locating the display at different degrees.

11. The flat panel display device as claimed in claim 10, wherein the raised portions of the stand are arranged at opposite sides of the passing groove and along a semicircle.

* * * * *